US011585900B2

(12) United States Patent
Nishita et al.

(10) Patent No.: US 11,585,900 B2
(45) Date of Patent: Feb. 21, 2023

(54) REFLECTING PRISM, MEASUREMENT TARGET OBJECT INCLUDING REFLECTING PRISM, SURVEYING DEVICE, COORDINATE COMPARING SECTION, SURVEYING METHOD, AND SURVEYING PROCESSING PROGRAM

(71) Applicant: TOPCON CORPORATION, Tokyo (JP)

(72) Inventors: Nobuyuki Nishita, Tokyo (JP); Yasushi Tanaka, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 1155 days.

(21) Appl. No.: 16/170,098

(22) Filed: Oct. 25, 2018

(65) Prior Publication Data

US 2019/0129007 A1  May 2, 2019

(30) Foreign Application Priority Data

Nov. 2, 2017  (JP) .............................. JP2017-212870

(51) Int. Cl.
*G01S 7/481* (2006.01)
*G01S 17/42* (2006.01)
(Continued)

(52) U.S. Cl.
CPC ............ *G01S 7/481* (2013.01); *G01C 15/002* (2013.01); *G01C 15/06* (2013.01); *G01S 17/42* (2013.01)

(58) Field of Classification Search
CPC .......... G01S 7/481; G01S 17/42; G01S 17/66; G01S 17/86; G01S 7/497; G01S 17/87; G01S 17/89; G01S 13/345; G01S 13/86; G01S 13/865; G01S 13/876; G01S 13/881; G01S 13/931; G01S 17/931; G01S 2013/9321; G01S 2013/93271;
(Continued)

(56) References Cited

U.S. PATENT DOCUMENTS 5,483,455 A * 1/1996 Lay ...................... G01S 13/345
                                                701/469
7,933,451 B2 * 4/2011 Kloer ..................... G06T 7/143
                                                382/190
(Continued)

FOREIGN PATENT DOCUMENTS

JP    2009-229192 A    10/2009
JP    2010-151682 A     7/2010
JP    2012-202821 A    10/2012

*Primary Examiner* — Daniel L Murphy
(74) *Attorney, Agent, or Firm* — Chiesa, Shahinian & Giantomasi PC

(57) ABSTRACT

In measurement with a surveying device having a surveying function and a laser scanner function, three-dimensional coordinates of a reflecting prism acquired with the surveying function and three-dimensional coordinates of a vertex of a polyhedron generated by processing point group data acquired with the laser scanner function are made to coincide with each other. The reflecting prism is used together with the surveying device having the surveying function and the laser scanner function, is provided to a measurement target object, and is disposed in such a position that the vertex position of the measurement target object coincides with or is considered to coincide with the optical center position of the prism.

10 Claims, 8 Drawing Sheets

(51) Int. Cl.
*G01C 15/06* (2006.01)
*G01C 15/00* (2006.01)

(58) Field of Classification Search
CPC .. G01S 2013/9329; G01S 5/163; G01S 7/006; G01S 7/4004; G01S 7/4026; G01S 7/4086; G01S 7/4802; G01S 7/4808; G01S 7/4812; G01S 7/4813; G01S 7/4817; G01C 15/06; G01C 15/02; G01C 15/002; G01C 15/004; G01C 15/006; G02B 5/122; G02B 7/003; G01B 11/002; G01B 11/005
USPC ......................................................... 356/4.01
See application file for complete search history.

(56) References Cited

U.S. PATENT DOCUMENTS

| | | |
|---|---|---|
| 8,767,190 B2 | 7/2014 | Hall |
| 9,739,610 B2 | 8/2017 | Nishita et al. |
| 9,858,712 B2* | 1/2018 | Stathis .................. G05D 1/024 |
| 10,776,639 B2* | 9/2020 | Steinberg .............. G06V 10/60 |
| 10,788,316 B1* | 9/2020 | Kalscheur ............. G01S 7/4972 |
| 11,092,689 B2* | 8/2021 | Kalscheur ............. G06F 16/248 |
| 2002/0144416 A1* | 10/2002 | Ghesla ................... G02B 5/122 |
| | | 33/293 |
| 2004/0135990 A1* | 7/2004 | Ohtomo ............... G01C 15/002 |
| | | 356/4.01 |
| 2009/0235541 A1* | 9/2009 | Kumagai ................ G01S 17/66 |
| | | 33/281 |
| 2010/0256940 A1 | 10/2010 | Ogawa et al. |
| 2012/0242830 A1 | 9/2012 | Kumagai et al. |
| 2015/0293224 A1 | 10/2015 | Eldada et al. |
| 2016/0161602 A1* | 6/2016 | Prokhorov ............ G01S 7/4972 |
| | | 702/97 |
| 2016/0341541 A1* | 11/2016 | Bridges ................. G01S 7/481 |
| 2017/0328992 A1* | 11/2017 | Baik ...................... G01S 17/42 |
| 2018/0231654 A1* | 8/2018 | Bilik .................... G01S 17/931 |

* cited by examiner

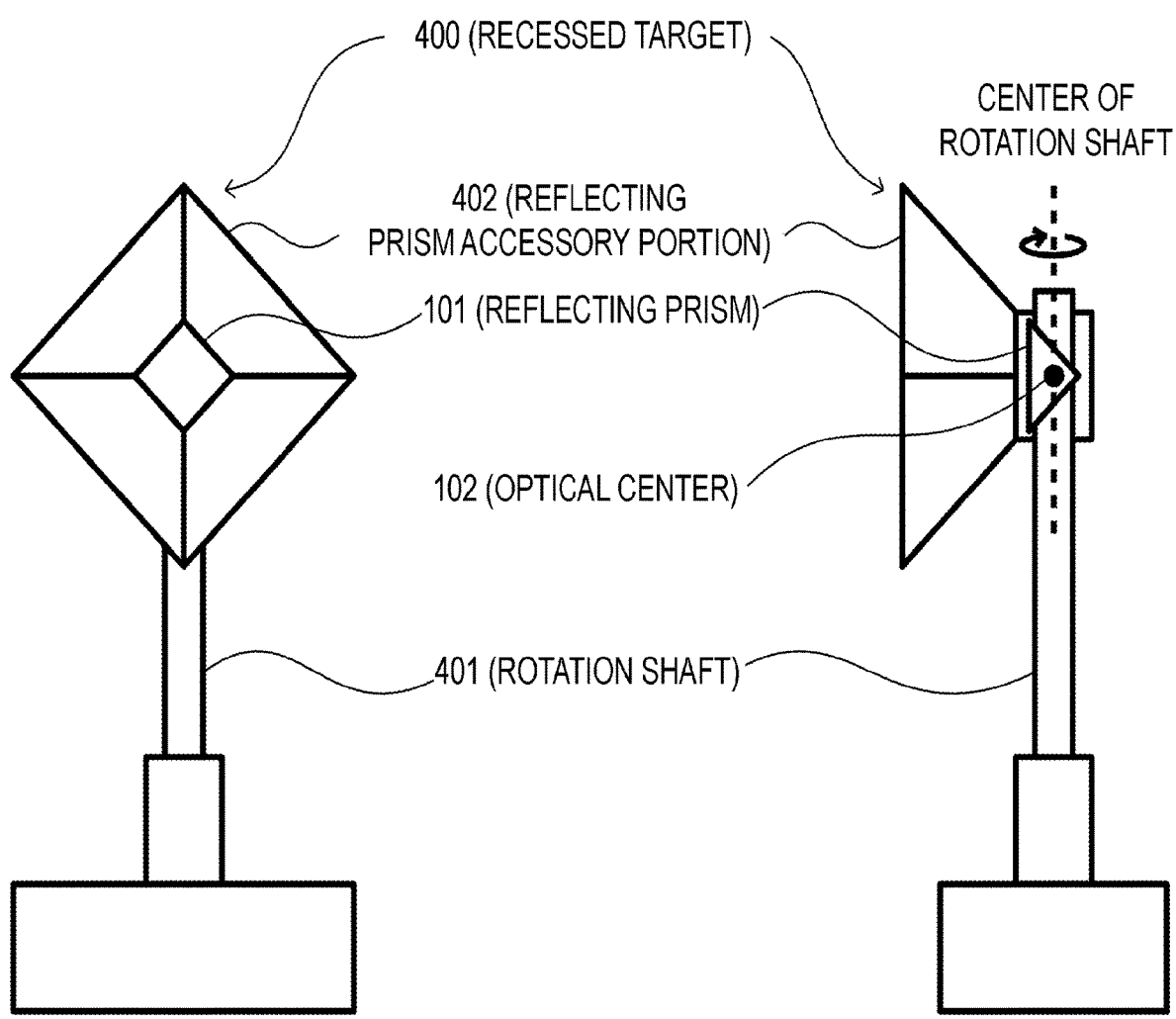

REFLECTING PRISM, MEASUREMENT TARGET OBJECT INCLUDING REFLECTING PRISM, SURVEYING DEVICE, COORDINATE COMPARING SECTION, SURVEYING METHOD, AND SURVEYING PROCESSING PROGRAM

CROSS-REFERENCE TO RELATED APPLICATION

This application claims priority to Japanese Patent Application No. 2017-212870 filed on Nov. 2, 2017, the entire disclosure of which is incorporated by reference herein.

BACKGROUND

The present invention relates to a reflecting prism and a surveying technique using the same.

As a surveying device, an automatic collimation tracking (motor-driven) total station (TS) is known that uses distance measuring light to accurately measure the position of a specific point (see JP 2009-229192 A, for example). As a device acquiring point group data of a surveying target object (target), a laser scanner is known (see JP 2010-151682 A, for example). In addition, a reflecting prism reflecting distance measuring light from a total station is known (see U.S. Pat. No. 9,739,610, for example).

SUMMARY

Conceivable is a surveying device in which a TS having high position measurement accuracy and a laser scanner capable of acquiring point group data in a wide range are combined. In this case, calibration is preliminarily required such that coordinates measured by the TS coincide with coordinates measured by the laser scanner. This is because, without the coordinates coinciding with each other, a problem arises in data accuracy in merging measurement data from the TS with point group data from the laser scanner.

A TS having a function to automatically track a target often measures a reflecting prism as the target, so that the coordinates of the optical center in the reflecting prism is measured as prerequisite coordinates. On the other hand, a laser scanner measures an object of which the outline is desired to be acquired, as a target, so that a surface of the target is measured. Under these circumstances, it is difficult for the TS and the laser scanner to measure the same point of an object being a target. A method of aligning coordinates using a flat plate may cause a problem of unbalanced evaluation of correctness of three-dimensional point group data measured by the scanner.

An object of the invention is to provide a technique that, by arranging a reflecting prism in such a position of a measurement target composed of one or a plurality of planes that the optical center position (flotation point) of the reflecting prism coincides with the vertex of a plane of the target, enables alignment of coordinates acquired with a surveying function and a laser scanning function.

The invention provides a reflecting prism that is provided to a measurement target object having a three-dimensional structure and that is disposed in such a position that a vertex position of the measurement target object coincides with or is considered to coincide with an optical center position of the prism. The invention also provides a reflecting prism of the above-described invention that includes an additional attachment/detachment portion configured to be attached to and detached from the measurement target object.

The invention also provides a measurement target object composed of a three-dimensional object being a measurement target of a surveying device having a surveying function and a laser scanner function, the measurement target object including the above-described reflecting prism. The invention also provides a measurement target object including a reflecting prism accessory portion being a measurement target together with the reflecting prism, the reflecting prism accessory portion having a shape enabling the optical center position of the reflecting prism to be fixed to the vertex position of the measurement target object or to a position considered to be the vertex position. The invention also provides a measurement target object including a rotation shaft enabling fixing and horizontal rotation of the reflecting prism and the reflecting prism accessory portion, the optical center position of the reflecting prism being located on a center line of the horizontal rotation.

The invention provides a surveying device including: a distance measuring section configured to measure a distance of the above-described reflecting prism; a horizontal angle detecting section configured to measure a horizontal angle of the reflecting prism; a vertical angle detecting section configured to measure a vertical angle of the reflecting prism; a laser scanner unit configured to measure point group data including three-dimensional coordinates of a measurement target object; and a coordinate comparing section configured to compare three-dimensional coordinates of the reflecting prism with vertex coordinates of a polyhedron being the above-described measurement target object, the polyhedron being capable of being generated from the point group data including the three-dimensional coordinates. The invention also provides a surveying device in which collimation to the reflecting prism is performed automatically.

The invention provides a coordinate comparing section being a controller configured to control a device having a surveying function and a laser scanning function, the coordinate comparing section including: a prism coordinate receiving section configured to receive three-dimensional coordinates of the above-described reflecting prism; a point group data receiving section configured to receive point group data acquired through laser scanning of a measurement target object; a vertex coordinate calculating section configured to acquire three-dimensional coordinates of a vertex of the measurement target object on a basis of the point group data; and a coordinate difference calculating section configured to calculate a difference between three-dimensional coordinates of an optical center position of the reflecting prism and the three-dimensional coordinates of the vertex calculated from the point group data.

The invention also provides a method of surveying a measurement target object including the above-described reflecting prism, the method including: receiving three-dimensional coordinates of an optical center position of the reflecting prism; receiving point group data acquired through laser scanning of the measurement target object; acquiring three-dimensional coordinates of a vertex of the measurement target object on a basis of the point group data; and calculating a difference between the three-dimensional coordinates of the optical center position of the reflecting prism and the three-dimensional coordinates of the vertex.

The invention also provides a surveying processing program for a measurement target object including the above-described reflecting prism, the surveying processing program being executed by being read by a computer, the surveying processing program causing the computer to function as: a prism coordinate receiving section configured to receive three-dimensional coordinates of an optical center position of the reflecting prism; a point group data receiving section configured to receive point group data acquired through laser scanning of the measurement target object; a vertex coordinate calculating section configured to acquire three-dimensional coordinates of a vertex of the measurement target object on a basis of the point group data; and a coordinate difference calculating section configured to calculate a difference between the three-dimensional coordinates of the optical center position of the reflecting prism and the three-dimensional coordinates of the vertex.

According to an aspect of the invention, a technique is achieved that can measure a difference between coordinates from a surveying device typified by TSs and coordinates acquired through laser scanning. The invention has superiority over the related art in: first, coordinates of data acquired from a surveying function section and a laser scanner function section can be aligned even if the two function sections are mounted in different positions; second, a vertex of a plane and an optical center of a prism are aligned to prevent an error even if the prism and the surveying device do not face each other; third, a plurality of planes are used to enable evaluation in consideration of a temporal difference in distance measuring and angle measuring; and fourth, the center of the prism is readily found, thereby simplifying calibration work.

Thus, measurement at high speed with high accuracy is achieved by implementing the invention. The invention can be moved for installation, so that by measuring differences between coordinates from the surveying device and coordinates acquired through laser scanning in different positions, the invention can also be implemented as a tool for device calibration or for inspection and adjustment.

BRIEF DESCRIPTION OF THE DRAWINGS

FIG. 8 is a schematic diagram of a recessed target.

DETAILED DESCRIPTION

1. First Embodiment

Overview

Figure 1:
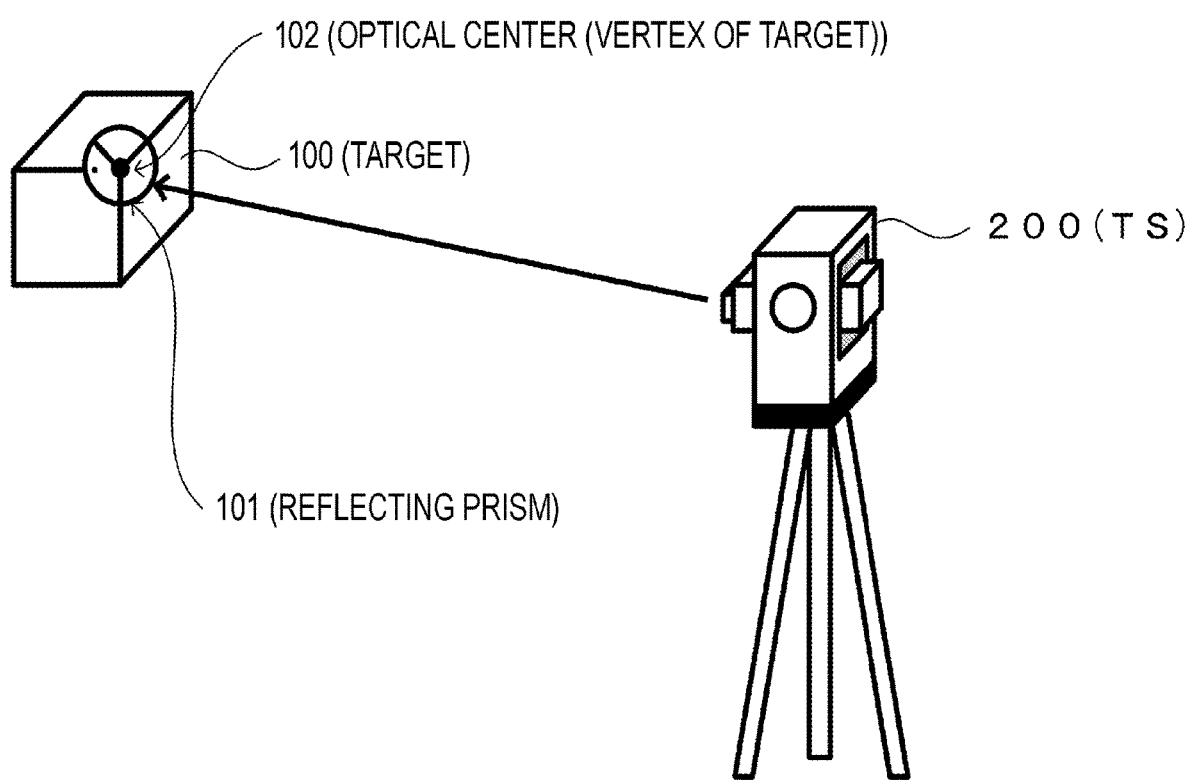
FIG. 1 is a schematic diagram of an embodiment.

FIG. 1 is a schematic diagram of the present embodiment. In this embodiment, a TS 200 having a surveying function and a laser scanner function measures position data and point group data of a target 100 being a measurement target object.

Configuration of Measurement Target Object

As illustrated in FIG. 1, the target 100 is a hexahedron including a reflecting prism 101 at one of vertices thereof. The reflecting prism 101 is disposed in such a position that its optical center 102 overlaps with the vertex of the target 100. Herein, the optical center refers to an apparent center position of the prism by refraction of light. In the position of the optical center, light incident on the reflecting prism is reflected. Note that the reflecting prism 101 may be detachable as long as the reflecting prism 101 has a structure capable of being fixed to an object.

Preferably, the positions of the optical center 102 of the reflecting prism 101 and the vertex of the target 100 coincide with each other with highest possible accuracy. However, an error in the above accuracy in coincidence is acceptable to some extent because of an error in position measurement of a scanning point in the laser scanner. As a guide, an error of 50% or less of the accuracy in position measurement in the laser scanner is acceptable. In this case, it is considered that the positions of the optical center 102 of the reflecting prism 101 and the vertex of the target 100 coincide with each other with an error accepted to some extent.

The shape of the target 100 capable of being used in the present embodiment is not limited to a hexahedron, and may be a polyhedron, such as a tetrahedron and an octahedron, or may have a curved surface, as long as the reflecting prism 101 can be disposed at a vertex. In a case of a target 100 having no vertex, as long as an intersecting point of extension lines of surfaces can be found, that intersecting point may be considered as a vertex.

Configuration of TS

Figure 2:
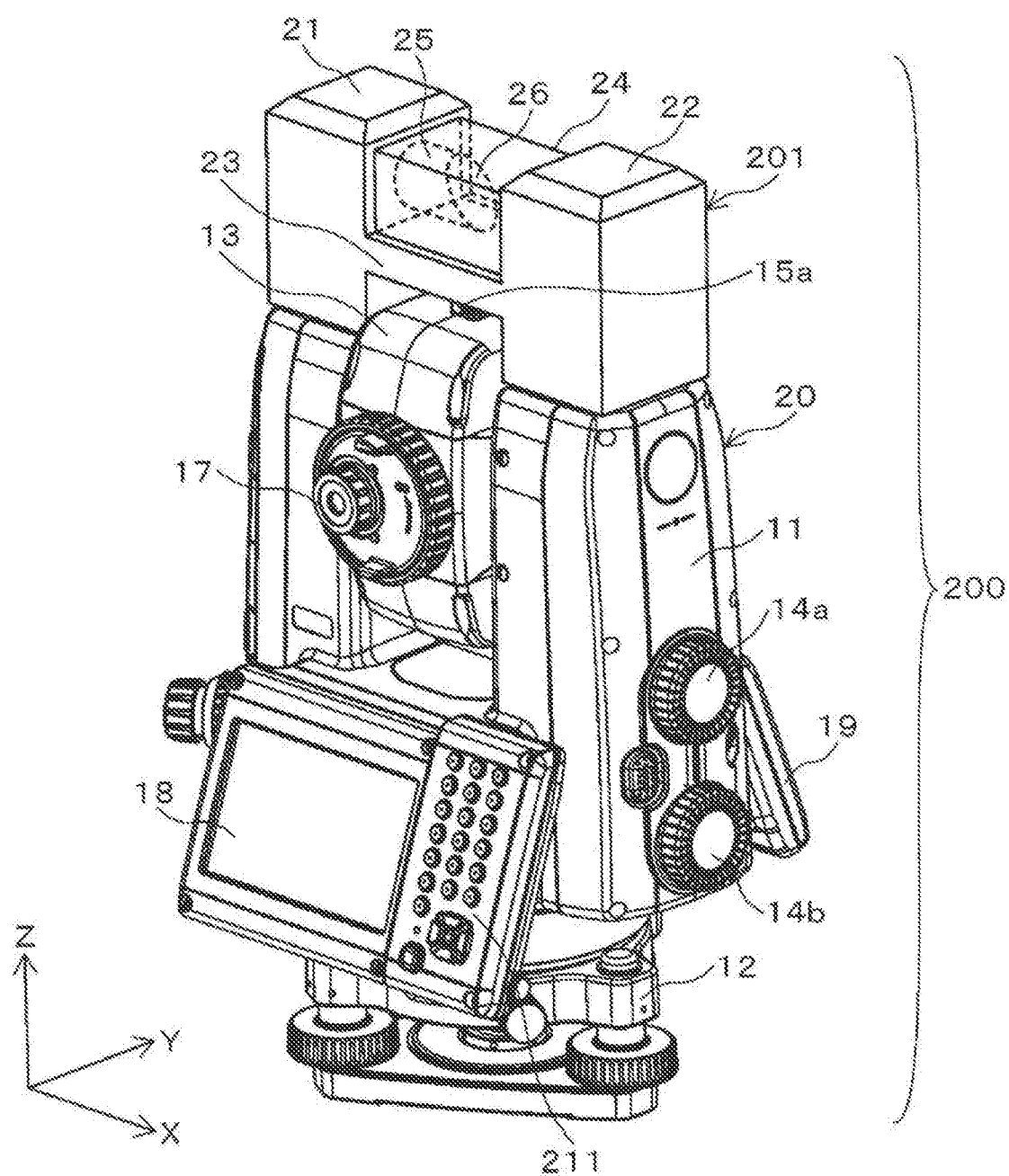
FIG. 2 is a perspective view of a TS.
Figure 3:
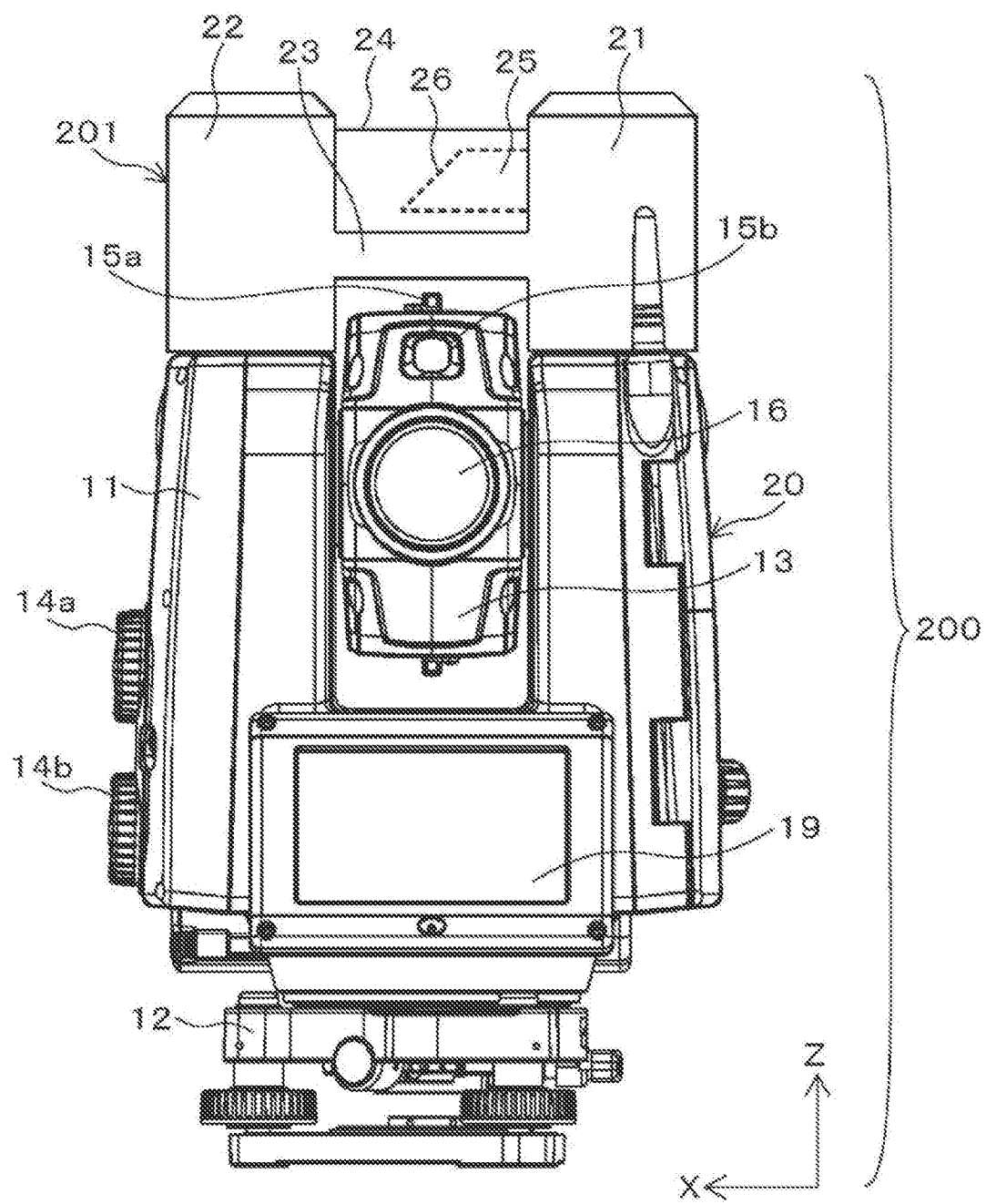
FIG. 3 is a front view of the TS.

FIG. 2 is a perspective view of the TS 200 illustrated in FIG. 1, and FIG. 3 is a front view. The TS 200 has a searching laser scanning function to search for a target (reflecting prism 101) and a mechanism for automatic collimation to the target found through the search. The mechanism for automatic collimation includes a tracking light emitting section 204 and a tracking light receiving section 205 constituting a tracking light transmitting/receiving section, a horizontal rotation driving section 208 and a vertical rotation driving section 209 constituting a motor driving mechanism for collimation using tracking light, and an automatic collimation controller (not illustrated but included in a computation controller 212) controlling automatic tracking. The TS 200 also has a laser distance measuring function to measure a distance to the target (reflecting prism 101) using distance measuring laser light, a function to measure a direction (horizontal angle and vertical angle (angle of elevation or depression)) of the target of which the distance is measured with laser, a function (surveying function) to calculate a three-dimensional position (coordinates) of the target on the basis of the distance to and direction of the target, and a laser scanning function to acquire point group data. The above surveying function is an original function of TSs (TS function) to accurately measure a position of a target.

As illustrated in FIG. 2, the TS 200 has a structure in which a TS body 20 and a laser scanner unit 201 are coupled (combined). The TS 200 includes a body portion 11. The body portion 11 is held on a base 12 in a horizontally rotatable manner. The base 12 is fixed to an upper portion of a tripod, which is not illustrated. The body portion 11 substantially has a U-shape having two extending portions extending upward when viewed in a Y-axial direction. A movable portion 13 is held between the two extending portions in such a manner that its vertical angle (angles of elevation and depression) can be controlled.

The body portion 11 rotates with respect to the base 12 on electricity. In other words, the horizontal rotation angle of the body portion 11 with respect to the base 12 is controlled with a motor. The vertical angle of the movable portion 13 is controlled with a motor. Driving for the control of the horizontal rotation angle and the vertical angle is performed by the horizontal rotation driving section 208 and the vertical rotation driving section 209 (see the block diagram in FIG. 4) equipped in the body portion 11. Note that the horizontal rotation driving section 208 and the vertical rotation driving section 209 will be described later.

A horizontal rotation angle control dial 14a and a vertical angle control dial 14b are disposed on the body portion 11. The horizontal rotation angle control dial 14a is operated to adjust the horizontal rotation angle of the body portion 11 (movable portion 13), and the vertical angle control dial 14b is operated to adjust the vertical angle of the movable portion 13.

A square tube shaped sighting device 15a for roughly taking a sight is disposed on an upper portion of the movable portion 13. In addition, an optical sighting device 15b having a narrower field of view than the sighting device 15a and a telescope 16 capable of more accurate collimation are disposed at the movable portion 13.

Images captured by the sighting device 15b and the telescope 16 can be visually confirmed by looking through an eyepiece portion 17. The telescope 16 also serves as an optical system for laser light for measuring a distance and tracking light for tracking and acquiring a distance measuring target (for example, a dedicated reflecting prism being a target). The optical system has such a design that the optical axes of the distance measuring light and the tracking light coincide with the optical axis of the telescope 16. The structure of this part is the same as those of commercially available TSs.

Displays 18 and 19 are attached to the body portion 11. The display 18 is integrated with an operating section 211 that will be described later. The displays 18 and 19 display various pieces of information necessary for operations of the TS 200, surveying data, and the like. The two displays are disposed on the front and the back, so that the display can be visually confirmed on either side without rotating the body portion 11. Note that a detailed structure of the described TS is disclosed in JP 2009-229192 A and JP 2012-202821 A, for example.

The laser scanner unit 201 is fixed to an upper portion of the body portion 11. The laser scanner unit 201 includes a first tower portion 21 and a second tower portion 22. The first tower portion 21 and the second tower portion 22 are coupled to each other with a coupling portion 23, and a space above the coupling portion (a space between the first tower portion 21 and the second tower portion 22) is covered with a protective case 24 composed of a member transmitting scanning laser light. Inside the protective case 24, a rotary portion 25 is disposed protruding from the first tower portion 21 in an X-axial direction. The rotary portion 25 has a tip having a shape obtained by being cut off diagonally, and a tilting mirror 26 is fixed to the tip.

The rotary portion 25 is driven by a motor housed in the first tower portion 21 and rotates about a rotation axis extending along the X axis. In addition to this motor, a drive circuit driving the motor and a control circuit thereof are housed in the first tower portion 21.

In the second tower portion 22, a light emitting section emitting a plurality of beams of laser scanning light, a light receiving section receiving scanning light reflected off a target object, and an optical system relating to the light emitting section and the light receiving section are housed. The laser scanning light is shone from the inside of the second tower portion 22 onto the tilting mirror 26, is reflected off the tilting mirror 26, and is emitted toward the outside via the transparent case 24. The scanning light reflected off the target object travels along a path opposite to that of the emitted light and is received by the light receiving section in the first tower portion 22.

Position measurement of a scanning point (reflecting point of the scanning light) is performed on the basis of a light emitting timing and a light receiving timing of the scanning light, and angular positions of the rotary portion 25 and horizontal rotation angles of the body portion 11 at these timings.

A plurality of beams of pulsed laser light for laser scanning are intermittently emitted from the transparent protective case 24 toward the outside while being shaped into a fan having an opening angle of approximately 20° to 45° in the extending direction of the rotation axis of the rotary portion 25. At this time, the laser scanning light is shone with the rotary portion 25 rotating. Thus, the laser scanning light shaped into a fan having a certain width in the X-axial direction is emitted from the laser scanner unit 201 while scanning is performed about the X axis. Here, if this laser scanning light is emitted while the body portion 11 rotates horizontally (rotates about a Z axis), laser scanning is performed for the entire surrounding (or a desired range).

Note that techniques relating to the laser scanner are disclosed in JP 2010-151682 A, U.S. Pat. No. 8,767,190, and the like. As the laser scanner, those of an electronic scanning type, such as the one disclosed in US 2015/293224 A can be used.

Figure 4:
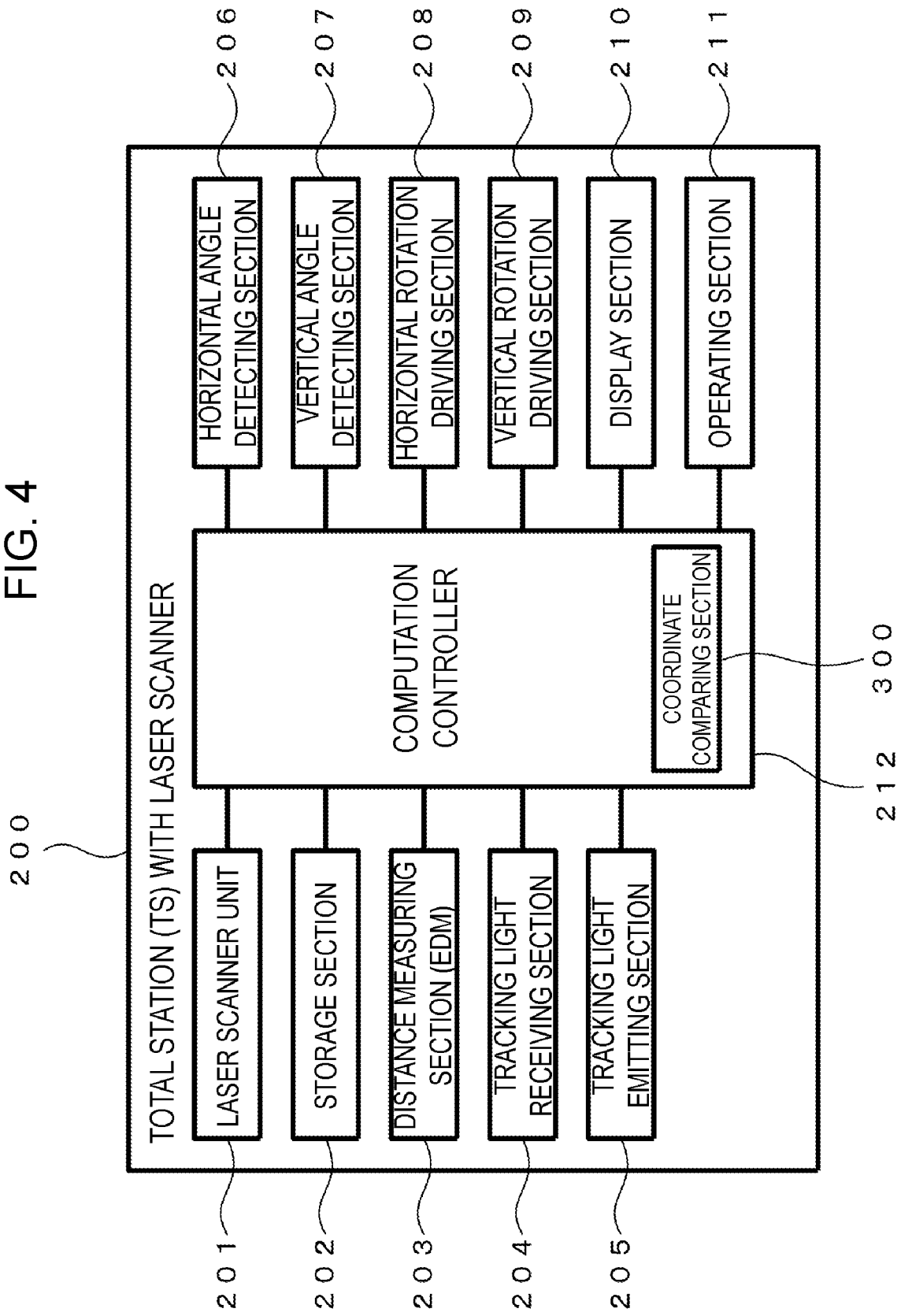
FIG. 4 is a block diagram of the TS.

FIG. 4 is a block diagram of the TS 200. The TS 200 includes the laser scanner unit 201, a storage section 202, a distance measuring section (EDM) 203, the tracking light emitting section 204, the tracking light receiving section 205, a horizontal angle detecting section 206, a vertical angle detecting section 207, the horizontal rotation driving section 208, the vertical rotation driving section 209, a display section 210, the operating section 211, and the computation controller 212.

The laser scanner unit 201 scans the measurement target object with the laser light and detects reflected light thereof to acquire the outline of the measurement target object as point group data having three-dimensional coordinates. Note that the coordinate system used for the three-dimensional coordinates provided to the point group data is the same as that for coordinates acquired by the distance measuring section 203, the horizontal angle detecting section 206, and the vertical angle detecting section 207, which will be described later. The storage section 202 stores a control program necessary for operations of the TS 200, various pieces of data, surveying results, and the like.

The distance measuring section 203 measures a distance to the target with the distance measuring laser light. The distance measuring section 203 includes a light emitting element for the distance measuring laser light, an emission optical system, a light reception optical system, a light receiving element, a distance measuring computing section, and an optical path of distance measuring reference light. The distance to the target object is calculated on the basis of a phase difference between the distance measuring light reflected off the target object and the reference light. A method for calculating the distance is the same as that for typical laser distance measuring.

The tracking light emitting section 204 and the tracking light receiving section 205 search for the reflecting prism 101 with searching laser light having a beam shaped into a triangular pyramid or a fan. That is, the searching laser light emitted by the tracking light emitting section 204 is shone onto the reflecting prism 101, and reflected light thereof is controlled so as to be positioned at the center of a light receiving element of the tracking light receiving section 205, thereby tracking the collimation target. This control is performed by the automatic collimation controller (not illustrated) included in the computation controller 212.

The horizontal angle detecting section 206 and the vertical angle detecting section 207 measure a horizontal angle and vertical angles (angles of elevation and depression) of the target 100 (reflecting prism 101) of which the distance is measured by the distance measuring section 203. A housing part including the distance measuring section 203 and an optical system for the tracking light emitting section 204 and the tracking light receiving section 205 can be controlled so as to rotate horizontally and to be positioned at an angle of elevation (angle of depression), and the horizontal angle and the vertical angles are measured with an encoder. Output from the encoder is detected by the horizontal angle detecting section 206 and the vertical angle detecting section 207, and the horizontal angle and the vertical angles (angles of elevation and depression) are measured.

The horizontal rotation driving section 208 and the vertical rotation driving section 209 include a motor controlling the horizontal rotation and positioning at an angle of elevation (and positioning at an angle of depression) of the housing part including the distance measuring section 203 and the optical system for the tracking light emitting section 204 and the tracking light receiving section 205, a drive circuit of the motor, and a control circuit of the drive circuit. Note that the laser scanner unit 201 has such a structure as to rotate horizontally together with the housing part.

The display section 210 provides or displays information with, for example, a technique for a graphical user interface (GUI) or the like so that an operator or the like operating the TS 200 can visually recognize a result of processing and the like. Note that the above-described displays 18 and 19 correspond to this section. The operating section 211 has a numeric keypad, a cross shaped operation button, and the like, and various operations and data relating to the TS 200 are input with the operating section 211. The display section 210 and the operating section 211 can be integrated by using a touch panel system on which the operator touches an information display screen for operation.

The computation controller 212 includes a coordinate comparing section 300 that will be described later, and controls computation relating to various types of operation control of the TS 200 and management of data stored in the storage section 202. The computation controller 212 may be configured by, for example, an electronic circuit, such as a central processing unit (CPU), an application specific integrated circuit (ASIC), and a programmable logic device (PLD), typified by a field programmable gate array (FPGA). Alternatively, some functions may be configured by dedicated hardware, and other functions may be configured by a general-purpose microcomputer.

Whether to configure the functional sections through dedicated hardware, or to configure the functional sections through software by using a CPU to execute a program, is decided in consideration of the required computation speed, cost, power consumption, and the like. Note that the option to configure functional sections by dedicated hardware and the option to configure functional sections through software are equivalent from the perspective of implementing a particular function.

Note that the TS 200 used in the invention is not limited to TSs and other surveying devices and may be substituted with another device having a surveying function and a laser scanner function. For example, a camera, a portable terminal, or the like having the above two functions can be substituted.

Figure 5:
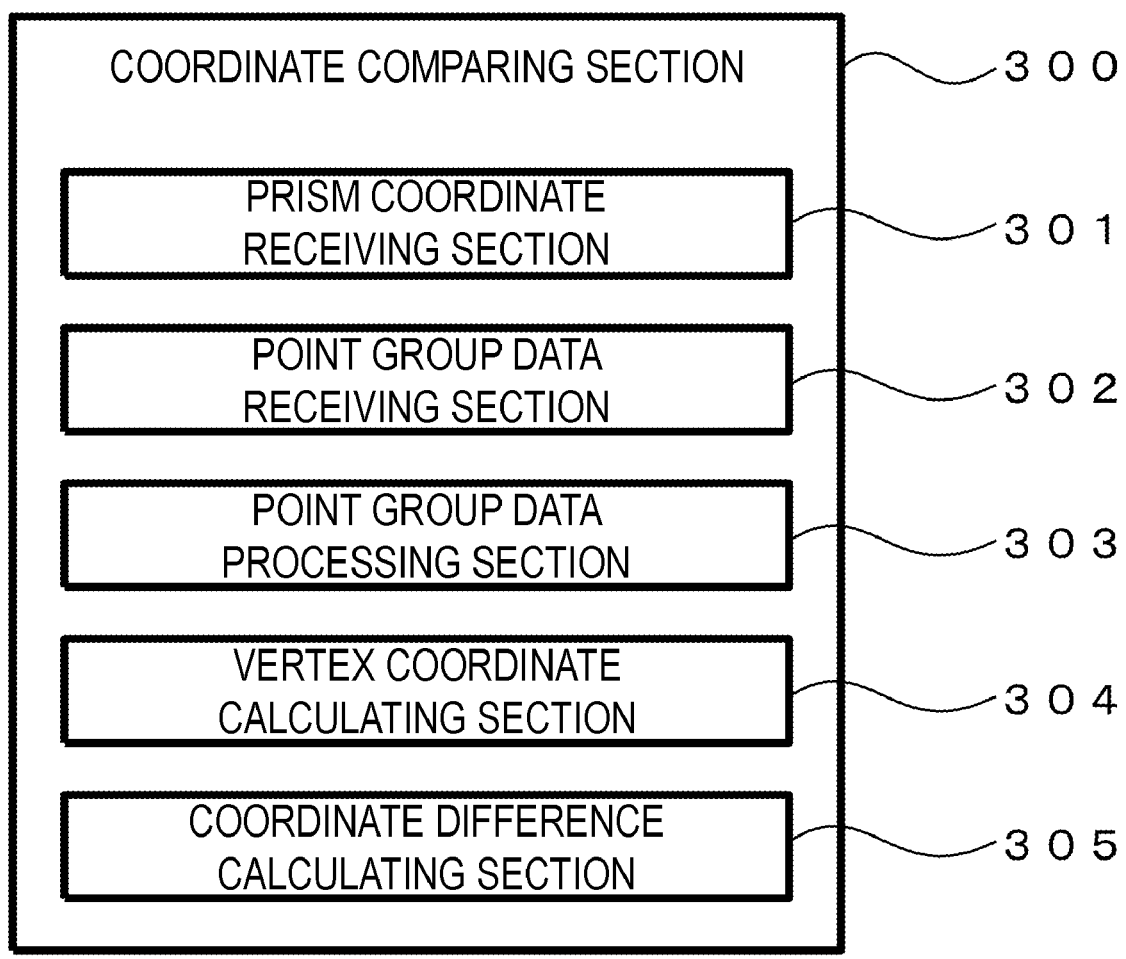
FIG. 5 is a block diagram of a coordinate comparing section included in the TS.

Configuration of Coordinate Comparing Section FIG. 5 is a block diagram of a coordinate comparing section 300. The coordinate comparing section 300 includes a prism coordinate receiving section 301, a point group data receiving section 302, a point group data processing section 303, a vertex coordinate calculating section 304, and a coordinate difference calculating section 305.

The prism coordinate receiving section 301 receives coordinates $(P_X, P_Y, P_Z)$ of the reflecting prism 101 calculated from data acquired by the distance measuring section 203, the horizontal angle detecting section 206, and the vertical angle detecting section 207, on the basis of a coordinate system having its origin at the position of installation of the TS 200. The reflecting prism 101 reflects incident light at the optical center 102 defined at the time of the design, so that the direction of the light changes 180°. The coordinates of the optical center 102 are used as the coordinates $(P_X, P_Y, P_Z)$ of the reflecting prism 101.

The point group data receiving section 302 receives point group data having three-dimensional coordinates acquired by the laser scanner unit 201. The point group data processing section 303 converts the point group data received by the point group data receiving section 302 into a polyhedron to acquire a state of each of the planes composing the measurement target object (the target 100 in the present embodiment). The vertex coordinate calculating section 304 acquires vertex coordinates $(S_X, S_Y, S_Z)$ calculated from the state of each of the planes acquired by the point group data processing section 303.

The vertex coordinates $(S_X, S_Y, S_Z)$ are calculated by the following method. The cubic or rectangular-parallelepiped target 100 illustrated in FIG. 1 is exemplified for description. In this case, laser-scanned data of planes visible from the TS 200 (in this case, three perpendicular planes adjacent to the reflecting prism 101) is obtained. An equation of the plane fitting the laser-scanned data configuring each of the planes is calculated. Then, an intersection of the equations of the three planes of which the laser-scanned data is obtained is acquired. This intersection is the above-described vertex having coordinates $(S_X, S_Y, S_Z)$.

The coordinate difference calculating section 305 calculates a difference between the coordinates $(P_X, P_Y, P_Z)$ of the reflecting prism 101 and the vertex coordinates $(S_X, S_Y, S_Z)$ of the measurement target object. If the vertex coordinate calculating section 304 acquires a plurality of vertex coordinates $(S_X, S_Y, S_Z)$, a difference between the coordinates $(P_X, P_Y, P_Z)$ of the reflecting prism 101 and each of the vertex coordinates, and the vertex having the smallest difference is determined as a vertex corresponding to the coordinates $(P_X, P_Y, P_Z)$ of the reflecting prism 101.

Figure 6:
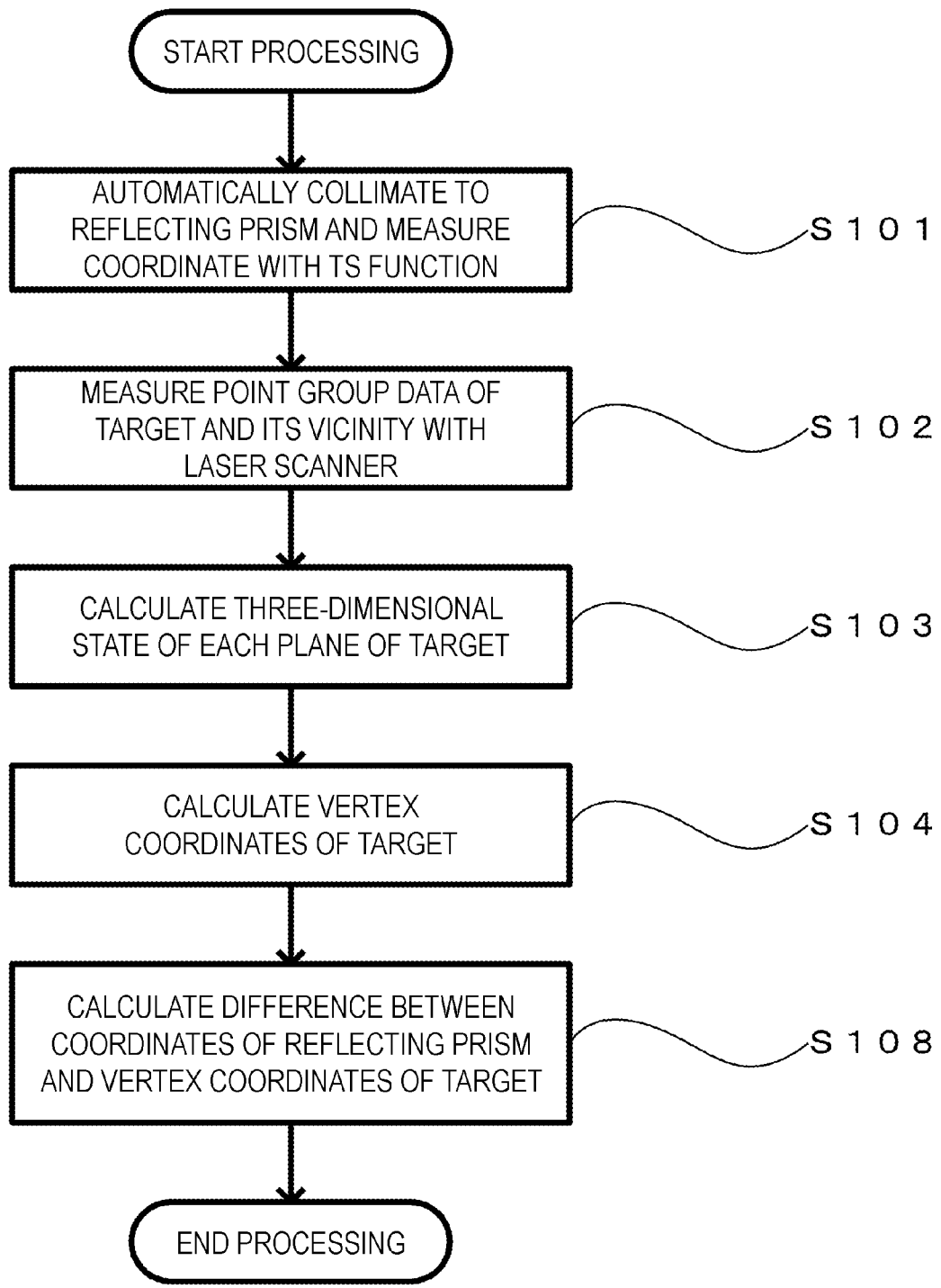
FIG. 6 is a flowchart of example processing.

Example Processing FIG. 6 illustrates example processing of the present embodiment. First, collimation to the reflecting prism 101 of the target 100 located in a desired position is performed automatically, and the three-dimensional coordinates $(P_X, P_Y, P_Z)$ of the reflecting prism 101 are measured (Step S101). This process is performed with the position measurement function (TS function) being an original function of the TS 200. In this process, the position of the reflecting point of the distance measuring light is calculated on the basis of the automatic collimation to the reflecting prism 101, measurement of the distance to the reflecting prism 101 at the distance measuring section 203, the measured distance, and the optical axis direction of the telescope 16 (acquired by the horizontal angle detecting section 206 and the vertical angle detecting section 207) at the time of the measurement. Note that the position coordinates of the optical center 102 of the reflecting prism 101 are used as the three-dimensional coordinates $(P_X, P_Y, P_Z)$. Next, the laser scanner unit 201 scans the target 100 and its vicinity to measure the point group data of the target 100 (Step S102). Then, a state of each of the planes composing the target 100

(in this case, an equation of each of the planes) is acquired from the point group data acquired in Step S102 (Step S103).

Subsequently, the coordinates ($S_X$, $S_Y$, $S_Z$) of the vertex at the intersecting point of the planes are acquired from the state of each of the planes (the equation of each of the planes) acquired in Step S103 (Step S104). Lastly, a difference between the coordinates ($P_X$, $P_Y$, $P_Z$) of the reflecting prism 101 and the vertex coordinates ($S_X$, $S_Y$, $S_Z$) of the measurement target object is calculated (Step S105), and the processing ends.

The difference between the optical center coordinates ($P_X$, $P_Y$, $P_Z$) of the reflecting prism 101 and the vertex coordinates ($S_X$, $S_Y$, $S_Z$) of the measurement target object acquired by the above-described processing from Step S101 to Step S105 can be used for correction, adjustment, and the like of the surveying device. For example, a control signal generating section, not illustrated in FIG. 4, of the coordinate comparing section 300 converts the result of the processing into a signal and transmits the signal to the computation controller 212, to utilize the signal for various types of control for correction, before-use adjustment, and the like of coordinates of data measured by the TS 200.

The result of the processing at the coordinate comparing section 300 needs to be used only by the computation controller 212. Thus, as long as the computation controller 212 and the coordinate comparing section 300 can exchange signals, the coordinate comparing section 300 is not limited to being provided in the computation controller 212 as illustrated in FIG. 4. For example, the coordinate comparing section 300 may be a separate device.

The target 100 includes the reflecting prism 101 at one of its vertices, so that the point group data at the vertex provided with the reflecting prism 101 cannot be acquired in Step S102. Step S104 thus performs a process of calculating the position of the vertex presumed from the state of each of the planes. This process acquires the equation of each of the planes from the point group data obtained through laser scanning and acquires common (x, y, z) coordinates by solving the equations of the planes as simultaneous equations. These coordinates indicate the position of the intersection of the planes and are the coordinates of the vertex 102 in the case of FIG. 1.

According to the present embodiment, a member in which the optical center (reflecting position) 102 of the reflecting prism 101 of which the position is measured by the distance measuring section 203 of the TS 200 coincides with the position of the vertex of the target 101 calculated from the point group data acquired by the laser scanner unit 201 is prepared as a calibration target (or a calibration check target), thereby enabling ready measurement for calibration of the position measurement function of the TS 200 and the laser scanner combined with the TS 200.

That is, the reflecting prism is disposed in such a position of the measurement target composed of one or a plurality of planes that the optical center position (flotation point) of the reflecting prism coincides with the vertex of a plane of the target, thereby enabling alignment of the coordinates acquired with the surveying function and the laser scanning function of the TS.

Modification 1

Figure 7:
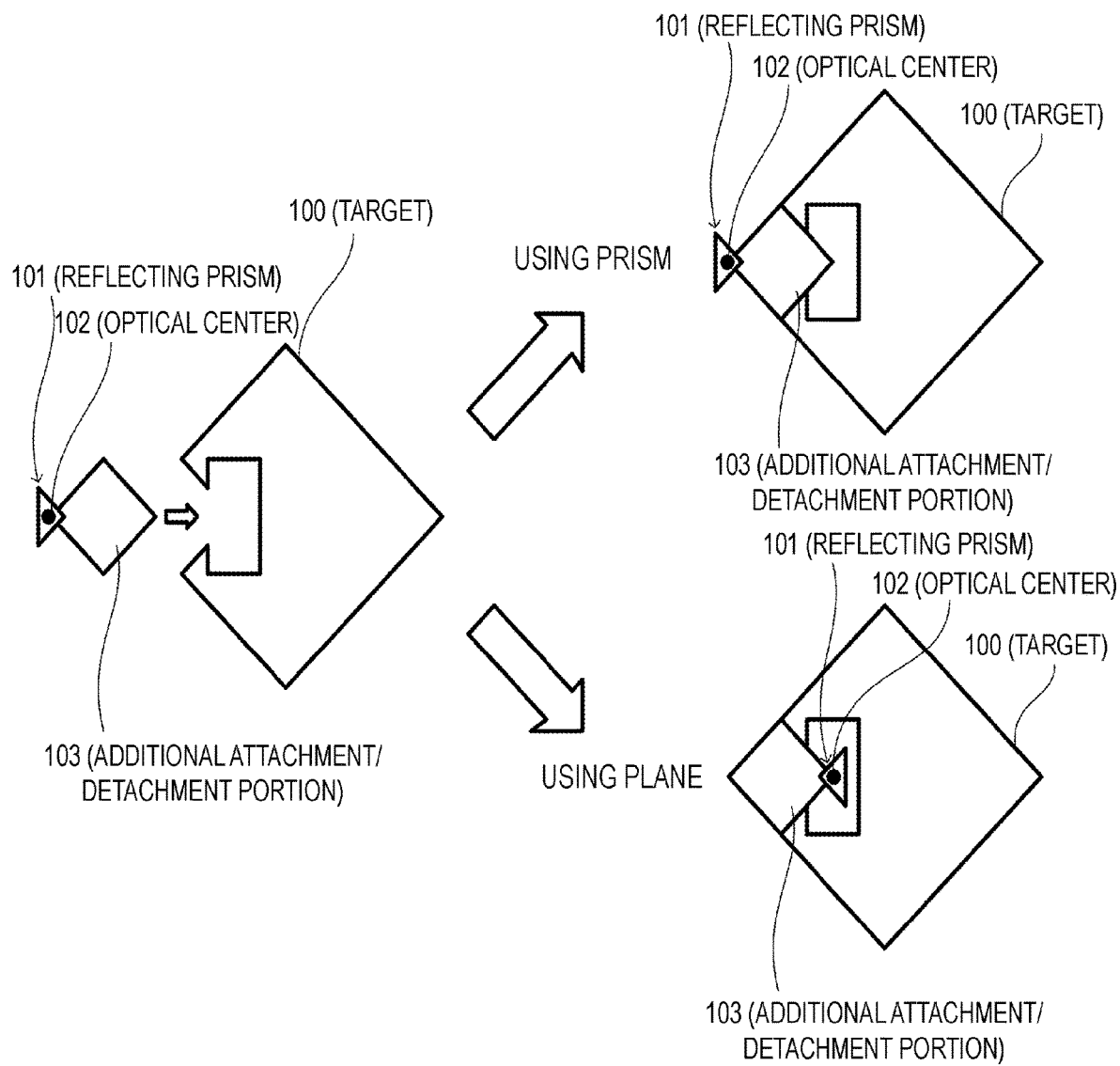
FIG. 7 is a schematic diagram of a target with a reflecting prism including an additional portion.

As illustrated in FIG. 7, the reflecting prism 101 may have a structure including an additional attachment/detachment portion 103 and capable of being detached from the target 100. The additional attachment/detachment portion 103 fixes the reflecting prism 101 to the target 100 and includes, for example, a magnet or an adsorption pad on a surface to be joined to the target 100.

With this structure, the side on which the reflecting prism 101 is attached can be brought to the front of the target 100 in measuring the reflecting prism 101, and the side on which no reflecting prism 101 is attached can be brought to the front in measuring the point group data of the target 100. This modification eliminates a portion of which the point group data cannot be acquired in Step S102, and is thus advantageous in that a plane is identified on the basis of the laser-scanned data with high accuracy. This modification also eliminates masking of the reflecting prism in laser scanning, thus simplifying the work.

Modification 2

As illustrated in FIG. 8, a measurement target may be a recessed target 400 having the reflecting prism 101 disposed at the inner part. With this structure, the recessed target 400 uses the inner peripheral surface of a quadrangular pyramid as a reflecting surface, and the recessed target 400 and the reflecting prism 101 are coupled to each other so that the vertex of the quadrangular pyramid coincides with or is considered to coincide with the optical center (reflecting point) of the reflecting prism 101.

The recessed target 400 includes a rotation shaft 401 and a reflecting prism accessory portion 402 in addition to the reflecting prism 101, and has a structure with which horizontal rotation about the rotation shaft 401 rotates the reflecting prism 101 and the reflecting prism accessory portion 402. The optical center of the reflecting prism 101 is positioned, coinciding with the center of the rotation shaft 401, thereby enabling measurement in various directions. Note that the reflecting prism accessory portion 402 may be shaped into a polygonal pyramid, such as a triangular pyramid, or a cone (including a corner cube) having a vertex coinciding with the optical center of the reflecting prism 101.

Note that, in the processing with the recessed target 400, Step S101 to Step S105 described above are performed with the reflecting prism 101 and the reflecting prism accessory portion 402 being point group data measurement targets (laser scanning targets).

2. Second Embodiment

The invention can also calibrate a camera using point group data of a measurement target object and vertex coordinates of a measurement target. This is based on calibration using a graphic pattern (for example, a dot pattern) having a known dimension. Acquired point group data is considered to be a pattern, and calculated vertex coordinates of a measurement target object are provided as known coordinates to perform calibration. Note that the calibration utilizing the invention may use any graphic pattern as long as the position of the vertex can be provided, for example, a pattern having straight lines or circles, or a bar code. The present embodiment is achieved by a TS or the like that can acquire an image with a camera.

Others

The invention can also be applied to a surveying device in which a TS and a laser scanner are combined and have optical origins coinciding with each other. Even if such a surveying device is produced with the TS and the laser scanner having the optical origins coinciding with each other in design and in consideration of component accuracy and assembly accuracy, a difference between timing of azimuth detection at the laser scanner and timing of acquisition of position measurement data and an error in the timing still remain as problems. Thus, calibration processing needs to be performed to ensure data compatibility between the position measurement function of the TS and the laser scanner even in this device. At this time, the invention can be utilized.

INDUSTRIAL APPLICABILITY

The invention can be used for surveying techniques.

What is claimed is:

1. A measurement target object comprising a three-dimensional target object as a measurement target of a surveying device having a surveying function and a laser scanner function, the measurement target object further comprising:
a reflecting prism disposed in such a position that a vertex position of the three-dimensional target object coincides with an optical center position of the reflecting prism.

2. The measurement target object including the reflecting prism according to claim 1,
wherein the reflecting prism includes an additional attachment/detachment portion configured to be attached to and detached from the measurement target object.

3. The measurement target object including the reflecting prism according to claim 2,
wherein the measurement target object includes a reflecting prism accessory portion being a measurement target together with the reflecting prism, the reflecting prism accessory portion having a shape enabling the optical center position of the reflecting prism to be fixed to the vertex position of the measurement target object or to a position considered to be the vertex position.

4. The measurement target object including the reflecting prism according to claim 3,
wherein the measurement target object includes a rotation shaft enabling fixing and horizontal rotation of the reflecting prism and the reflecting prism accessory portion, the optical center position of the reflecting prism being located on a center line of the horizontal rotation.

5. A surveying device comprising:
a distance measuring section configured to measure a distance of a reflecting prism, the reflecting prism being disposed in such a position that a vertex position of a three-dimensional object coincides with an optical center position of the reflecting prism;
a horizontal angle detecting section configured to measure a horizontal angle of the reflecting prism;
a vertical angle detecting section configured to measure a vertical angle of the reflecting prism;
a laser scanner unit configured to measure point group data including three-dimensional coordinates of a measurement target object; and
a coordinate comparing section configured to compare three-dimensional coordinates of the reflecting prism with vertex coordinates of a polyhedron, the polyhedron being the measurement target object with the polyhedron being capable of being generated from the point group data including the three-dimensional coordinates, the coordinate comparing section further comprising:
a prism coordinate receiving section configured to receive the three-dimensional coordinates of the reflecting prism;
a point group data receiving section configured to receive the point group data measured through laser scanning by the laser scanner unit;
a vertex coordinate calculating section configured to acquire the three-dimensional coordinates of the vertex of the measurement target object on a basis of the point group data; and
a coordinate difference calculating section configured to calculate a difference between the three-dimensional coordinates of the optical center position of the reflecting prism and the three-dimensional coordinates of the vertex calculated from the point group data.

6. The surveying device according to claim 5,
wherein collimation to the reflecting prism is performed automatically.

7. A method of surveying a measurement target comprising having a three-dimensional target object as a measurement target of a surveying device having a surveying function and a laser scanner function, the method comprising:
receiving three-dimensional coordinates of an optical center position of a reflecting prism, the reflecting prism being disposed in such a position that a vertex position of the three-dimensional target object coincides with an optical center position of the reflecting prism;
receiving point group data acquired through laser scanning of the measurement target object;
acquiring three-dimensional coordinates of a vertex of the measurement target object on a basis of the point group data; and
calculating a difference between the three-dimensional coordinates of the optical center position of the reflecting prism and the three-dimensional coordinates of the vertex.

8. The method of claim 7 wherein the reflecting prism includes an additional attachment/detachment portion configured to be attached to and detached from the measurement target object.

9. The method of claim 8 wherein the measurement target object includes a reflecting prism accessory portion being a measurement target together with the reflecting prism, the reflecting prism accessory portion having a shape enabling the optical center position of the reflecting prism to be fixed to the vertex position of the measurement target object or to a position considered to be the vertex position.

10. The method of claim 9 wherein the measurement target object includes a rotation shaft enabling fixing and horizontal rotation of the reflecting prism and the reflecting prism accessory portion, the optical center position of the reflecting prism being located on a center line of the horizontal rotation.

* * * * *